Sept. 12, 1933.  W. G. SCHMIDT  1,926,990
CUTTING MACHINE
Filed Jan. 9, 1931  2 Sheets-Sheet 1

Inventor
William G. Schmidt
by Frank J. Schraeder
Attorney

Sept. 12, 1933.  W. G. SCHMIDT  1,926,990
CUTTING MACHINE
Filed Jan. 9, 1931  2 Sheets-Sheet 2
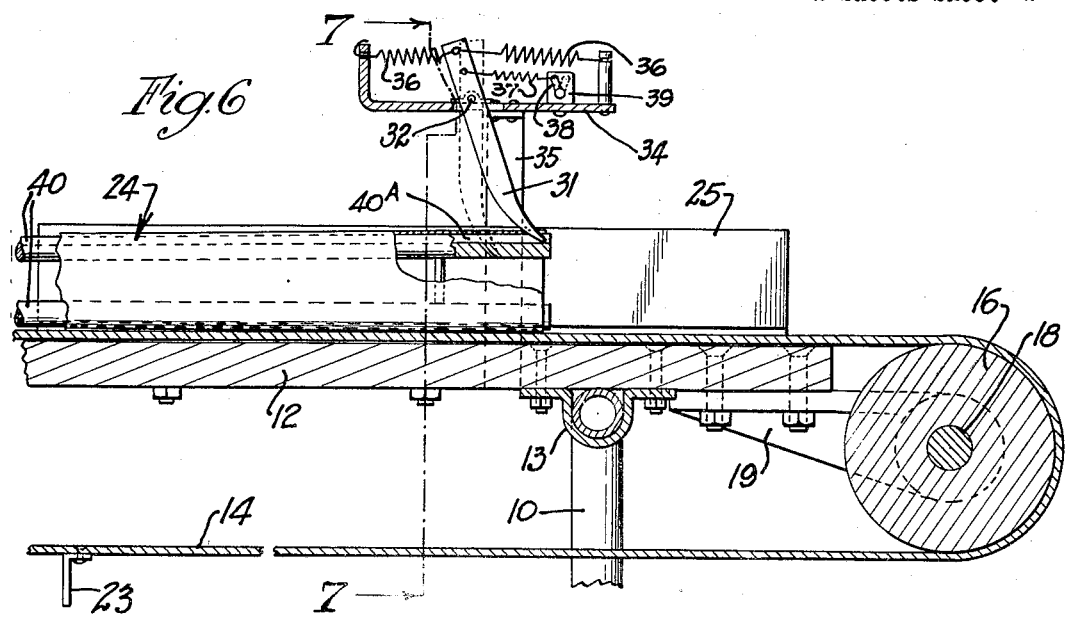
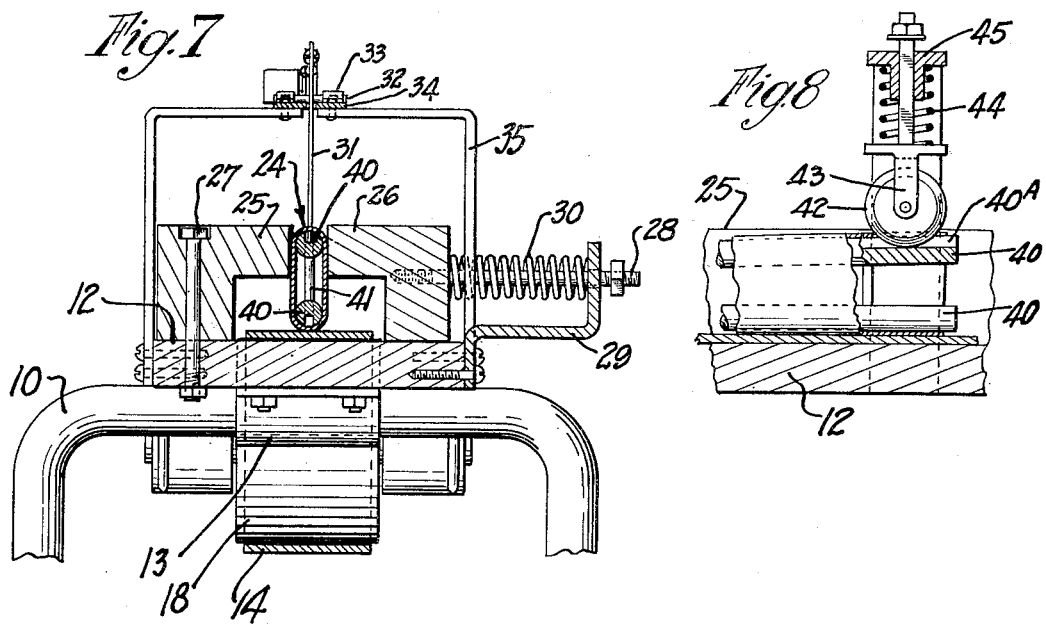
Inventor
William G. Schmidt
by Frank J. Schraeder
Attorney Patented Sept. 12, 1933

1,926,990

UNITED STATES PATENT OFFICE 1,926,990

CUTTING MACHINE

William G. Schmidt, Chicago, Ill., assignor to Sidney Degginger, Chicago, Ill.

Application January 9, 1931. Serial No. 507,644

6 Claims. (Cl. 164—38)

This invention relates generally to cutting machines and has particular reference to machines for cutting casings used in the manufacture of sausages, and the like.

The invention has among its objects the production of a simple and efficient machine for cutting casings longitudinally to permit two or more casings to be sewed together to produce one of a larger diameter.

The machine is particularly adaptable for cutting casings which are prepared from hog bungs, beef rounds, beef middles, beef open ends, beef fat ends, and other casings which may be dried, or partially dried and cut for purposes, as above stated, of being sewed together.

After the casings have been prepared preliminary to their longitudinal cutting, they are mounted of threaded onto a drying support consisting of a pair of longitudinal members which are rigidly held in spaced and slightly tapered relation to each other to permit easy mounting and which taper conforms to the general natural taper of the casing.

Another object of the invention is to provide a machine having a power-driven conveyer adapted to receive and support the mounted casings and forcibly positively move same longitudinally through cutting means to thereby cut the casing longitudinally.

A further object of the invention is to provide a machine of this character with guiding and supporting means for the casing and its support during the cutting operation; such means comprising preferably guides having a wedge-shaped entrance opening and a resilient side member.

Still another object of this invention is found in the provision of resiliently mounted cutting means adapted for automatic vertical adjustment to the tapered casing support.

With the above and other objects in view my invention consists in the novel combination, construction and arrangement of the parts and members, shown in preferred embodiment in the accompanying drawings, described in the following specifications and particularly pointed out in the appended claims.

Referring to the illustrations:

Fig. 6 is an enlarged section taken on line 6—6 of Fig. 1.

Fig. 7 is a cross-section taken on line 7—7 of Fig. 6.

Fig. 8 is an elevation, in part section, showing a modified form of cutter.

Figure 1:
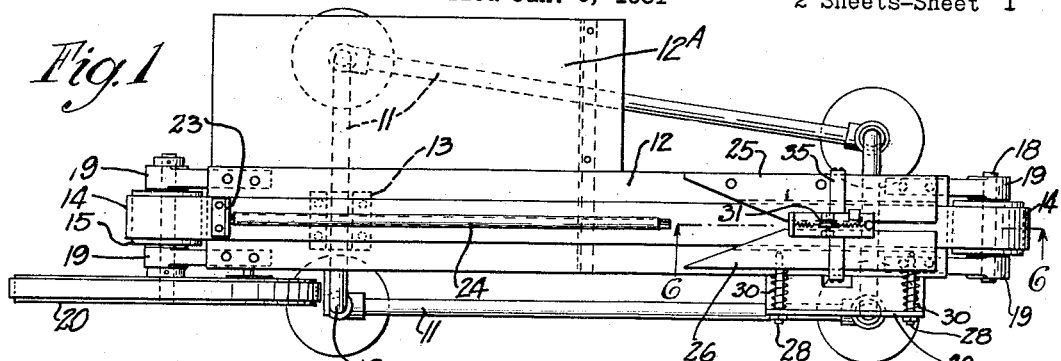
Fig. 1 is a plan view of a cutting machine embodying my invention.
Figure 2:
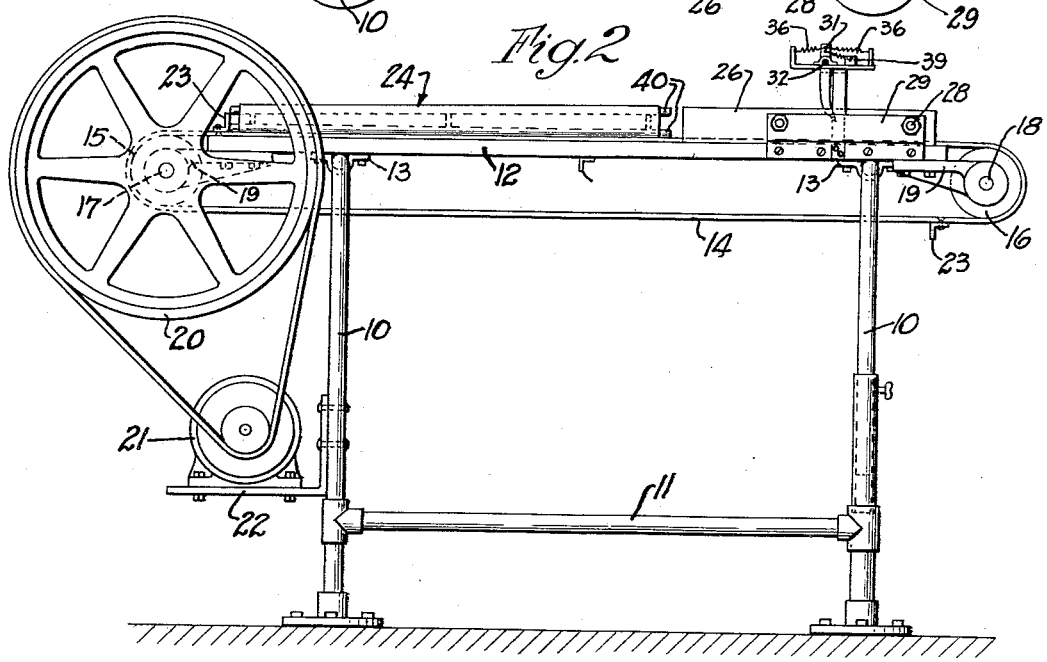
Fig. 2 is a side elevation of same.

In the embodiment of my invention as illustrated in Figs. 1 to 7 inclusive, the machine comprises a supporting pipe structure consisting of vertical stands 10 cross connected near their lower ends with strut pipe members 11. The vertical members 10 in the present instance being of inverted U formation. A table 12 consisting substantially of a wood plank is rigidly supported on the members 10 by means of suitably bent straps 13.

An endless conveyor belt 14 is trained over the pulleys 15 and 16 which are respectively mounted on shafts 17 and 18 which are supported in bearings 19 fixed to the underside of the table member 12.

The shaft 17 is extended to receive a fly-wheel drive pulley 20 which is belt-driven by an electric motor 21 which is supported on a bracket 22.

The upper strand of the conveyor 14 is arranged to travel directly over the top of the table member 12 which supports such upper strand substantially in its entire length from pulley to pulley.

The outer face of the conveyor belt 14 is provided with a plurality of angles 23 rigidly secured to the belt and successively adapted to push the mounted casings 24 placed on the belt through the wedge-shaped entrance of the guide members 25 and 26.

The guide member 25 is rigidly mounted to the plank 12 by means of bolts 27 but the guide member 26 is relatively loosely mounted on laterally extended bolts 28 slidably supported in the bracket 29. A pair of coil springs 30 disposed over the bolts 28 between the side member 26 and the bracket 29 provide sufficient pressure against the member 26 to guide the mounted casing 24 between it and its companion guide 25 for the proper cutting by the knife 31.

The knife 31 is pivotally mounted on pin 32 which is supported in clips 33 on the bar 34.

The bar 34 is supported on the brackets 35.

The upper end of the knife 31 is held in balance by a pair of coil springs 36. Another coil spring 37 is attached at one end to the knife and at its other end to the arm 38 of the counting device 39 which registers the number of casings cut upon each oscillation of the knife between cutting operations.

Figure 3:
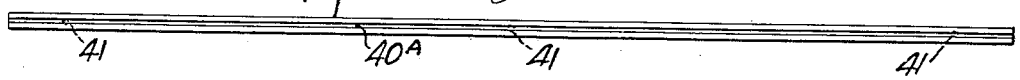
Fig. 3 is a top view of the casing support.
Figure 4:
Fig. 4 is a side elevation of the casing support.
Figure 5:
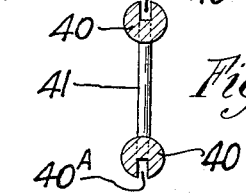
Fig. 5 is a cross-section taken on line 5—5 of Fig. 4.

Referring to Figs. 3, 4 and 5, showing the casing support, the longitudinal members 40 which may be made of hard wood or other suitable material, are disposed in a common plane in one direction to permit their vertical alignment in passing through the cutting operation but such members 40 are mounted in a slightly tapered direction relatively to each other in such plane to facilitate mounting of the casing thereon. Such tapered formation is retained by means of the short struts 41 interconnecting the spaced members 40.

The casing frame or support members 40 are also grooved longitudinally on opposite sides as at 40A to provide grooves for the end of the cutting knife 31.

A modified form of cutting instrumentality is shown in Fig. 8, which comprises a circular knife 42 pivotally mounted in a yoke 43 which is spring-pressed downwardly by the spring 44 held between the top of the yoke 43 and the support 45.

In operation, the casings which have been mounted on the frame supports and stacked on the table extension 12A are manually placed upon the upper strand of the belt 14 and held until engaged by one of the angle pushers 23 and forced into and between the guide blocks 25 and 26 whereupon the angle pushers will forcibly move same through guide blocks while the knife 31 cuts the casing longitudinally.

After cutting, the casings are received by an operator and stacked for conveyance to the sewing department where one or more casings are sewed together to form one of greater diameter.

I claim:

1. A cutting machine of the character described comprising a cutting instrumentality, feeding means movable in one direction adapted to successively feed a plurality of independent frames having material mounted thereon for slitting by said cutting instrumentality, means forming a narrow open-ended guideway positioned above said feeding means for guiding said frames during the slitting operation, and a stationary support for said cutting instrumentality.

2. A cutting machine as embodied in claim 1, and including said frame guiding means comprising spring-pressed walls between which said frames are passed during slitting operation.

3. A cutting machine of the character described comprising a slitting instrumentality, an endless belt adapted to successively feed a plurality of independent frames with material mounted thereon for slitting by said cutting instrumentality, means forming a narrow open-ended guideway positioned above said belt for guiding said frames during the slitting operation, means connected to said endless belt for forcibly projecting said frames through said guiding means during the slitting operation and a support for said slitting instrumentality.

4. A cutting machine as embodied in claim 3, and including said frame guiding means comprising spring-pressed walls between which said frames are passed during slitting operation.

5. A cutting machine as embodied in claim 3, and including resilient means for said slitting instrumentality adapted to accommodate said slitting instrumentality for cutting material mounted on frame gradually tapered in their length, said resilient means being mounted between said support and said slitting instrumentality.

6. A cutting machine of the character described comprising an endless movable belt adapted to successively feed a plurality of frame elements having material mounted thereon for longitudinal slitting thereof, a narrow open-ended guideway positioned above said belt and adapted to guide said frame elements during the slitting operation, and a cutter disposed above said guideway and yieldingly urged into cooperative relation with the material carried by said frames.

WILLIAM G. SCHMIDT.